United States Patent Office 2,891,844
Patented June 23, 1959

2,891,844
PURIFICATION OF SILICA SANDS

Frederick William Adams, Ealing, London, England, assignor to Rockware Glass Limited, Greenford, England, a British company No Drawing. Application April 2, 1956
Serial No. 575,355

Claims priority, application Great Britain August 8, 1955

5 Claims. (Cl. 23—182)

This invention relates to the purification of silica sands and has particular reference to the reduction of the amount of contaminating iron oxide present on the surface of silica sands so as to render them available for use in the production of colourless or white glass.

Sand, which is composed mainly of silica, constitutes the largest constituent of most commercial glasses, which may contain up to about 80 percent of silica. Most sands contain iron oxide in amount and in forms which vary according to the source of the sand, but this iron oxide is most frequently present mainly as a surface coating on the individual grains of sand.

The effect of the presence of iron oxide in sands is to produce a green tint, of more or less intensity, in glass made therefrom, so in the production of co-called colourless glass from such sands some means, such as the addition to the glass melt of another colouring agent, has to be employed for masking the green colour due to the presence of iron in the glass. For example, the green tint produced by iron is frequently corrected by the addition to the glass-making materials of another colouring agent (such as selenium which by itself would impart to the glass a pink colour) in order to produce a colour complementary to the green colour due to the iron, whereby the combination of tints results in a neutral colour to produce the so-called colourless glass.

For colourless glass produced in the manner mentioned above by the use of decolourising agents the amount of iron oxide in the sand must be low, preferably not exceeding about 0.04 percent, whilst for the best quality glasses the iron oxide content of the sand must be much lower, namely, not exceeding about 0.01 percent. Sands of such purity are available from continental sources, but there are few sand deposits in Great Britain and other countries (and these only of limited extent) which conform to this low iron oxide content. Most sands therefore require some form of preliminary chemical treatment in order to reduce their iron oxide content sufficiently to render them suitable for the manufacture of colourless glass.

Various methods have been proposed for the purification of glass-making sands with the object of effecting a substantial reduction of their iron oxide content. Amongst such proposals there may be mentioned waterwashing as one of the commonest employed, but this only removes any iron-bearing clay or silt. It has also been proposed to treat the sand at atmospheric temperatures with dilute solutions of sodium carbonate, sodium hexametaphosphate, and sodium sulphide, but treatment with these reagents effects little more reduction of the iron oxide content of the sand than does ordinary water washing, and the coating of iron oxide on the sand grains themselves is left substantially unaffected.

Other methods that have been suggested involved treating the sand with dilute hydrofluoric acid together titanous chloride or sodium hydrosulphite, or with oxalic with reducing agents, such as titanous sulphate or acid and a reducing agent such as titanous chloride; such methods however do not usually require heat.

Methods have also been proposed in which the dry sand was heated with ammonium chloride, strong sulphuric acid, caustic soda or common salt.

On account of various practical or economic difficulties, few of the prior methods mentioned above have had any extensive commercial application.

It has also been proposed to treat silica sands with a warm aqueous solution containing a small quantity of an acid oxalate or quadroxalate together with a small amount of ferrous sulphate. With this method however it was only possible to treat sands with an iron oxide surface coating not exceeding about 0.08 percent and to reduce the associated iron oxide content of the sand to about 0.02 percent.

The present invention has for its object to provide an efficient, simple and inexpensive method for the purification of silica sands by removing the ferruginous film or coating from the individual grains of sand so as to render the sand suitable for use in the manufacture of colourless glass. The process employed for this purpose is based on the fact that oxygen, in the free state or in a combined form, is required in order to enable metallic copper to dissolve in dilute sulphuric acid. With the oxygen present in the free state, the reaction can be expressed by the following equation:

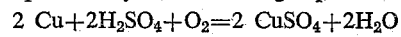

$$2\ Cu + 2H_2SO_4 + O_2 = 2\ CuSO_4 + 2H_2O$$

In the case of the reaction taking place in the presence of an iron-oxide coated sand, the equation expressing the reaction may be written as follows:

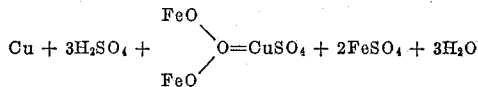

$$Cu + 3H_2SO_4 + \begin{matrix} FeO \\ \\ FeO \end{matrix} = CuSO_4 + 2FeSO_4 + 3H_2O$$

At normal temperatures the reaction proceeds very slowly, but as the temperature is raised the reaction proceeds more rapidly. The presence of a small quantity of sodium chloride assists the reaction. Other chlorides, for example ammonium chloride and potassium chloride, behave similarly to sodium chloride, but the latter is preferred owing to its cheapness and availability.

Thus according to the present invention a process for the purification of silica sands by the reduction of the associated surface iron oxide content thereof to a fraction not exceeding about one half of the said original surface iron oxide content consists in subjecting the sand to treatment with a hot aqueous solution, at a temperature of the order of about 70° C. to 90° C., containing a small quantity of sulphuric acid of the order of about 1 to 2 percent by weight of the said solution and a smaller quantity, of the order of about 1 to 10 percent by weight of the sulphuric acid, of a soluble inorganic chloride which dissolves in the said solution without the formation of an insoluble sulphate, in the presence of metallic copper having a large surface area so that the sand grains and solution have ample opportunity to come into contact with the copper during the purification treatment. The chloride selected must, as just mentioned, be one that does not react with sulphuric acid to form an insoluble sulphate, suitable chlorides for this purpose being sodium chloride, potassium chloride, magnesium chloride, and ammonium chloride, sodium chloride being preferred for the reasons previously mentioned.

In carrying out the process, the sand to be purified together with the treatment solution (containing small amounts of sulphuric acid and a chloride) is heated in intimate contact with metallic copper having a large surface area in any suitable form of apparatus.

The reaction proceeds more rapidly as the temperature is raised, but the temperature should be lower than 100° C., since at that temperature basic sulphates of iron are liable to be precipitated and render the process useless. The best temperature range for the treatment is about 70° C. to 90° C., a temperature close to 90° C. being preferable. Sufficient time should be allowed for the sand to reach the operating temperature range and also to allow the sand grains to remain in contact with the metallic copper and acid chloride solution long enough for the iron oxide on the sand grains to be chemically reduced and dissolved.

The following is an example of the new process of treatment of sand according to the present invention.

Two parts by weight of sand with an original $Fe_2O_3$ content of 0.17 percent by weight was made into a slurry with one part by weight of an aqueous solution containing 2 percent by weight of sulphuric acid and 0.20 percent by weight of sodium chloride. The mixture of sand and acid brine solution was then allowed to percolate through a copper tube provided internally with copper rods or tubes (preferably rods) arranged so as to give an ample metallic surface contact for the sand and acid brine solution during their passage through the tube. These internal copper rods or tubes assist the mixing of the sand and solution, in addition to providing additional metallic contact for the sand grains. The copper tube is made of suitable diameter and length depending upon the throughput of sand required, and is arranged so as to be rotatable, for example at 100 to 150 revolutions per minute. The copper tube should be lagged in order to conserve heat and surrounded by an outer acid-resisting casing, since the copper takes part in the reaction and the tube gradually dissolves. The sand and acid brine solution, in the proportions of two parts by weight sand and one part by weight solution, as above stated, were then introduced into the upper end of the rotating copper tube, which was slightly inclined to the horizontal, together with steam in order to raise the temperature of the tube and its contents to about 90° C. If desired, the sand and solution could be pre-heated to the desired temperature before being admitted to the tube, and thus reduce the amount of steam required in the tube to maintain the tube and its contents at the temperature necessary for the reaction to take place.

The rate of flow of the sand, acid brine solution and steam through the copper tube was regulated so that the sand and solution, emerging at the lower end of the copper tube, were at or near 90° C., and the reduction and solution of the iron oxide surface coating of the sand grains were substantially completed. The progress of the sand and solution through the copper tube was assisted by the steam and by the inclination of the tube.

The solution, containing the iron and copper salts, was then drained from the sand emerging from the lower end of the copper tube and the purified sand was then thoroughly washed with water so as to free it from all traces of the soluble copper and iron salts produced during the reaction, and the $Fe_2O_3$ content of the sand was then found to be only 0.023 percent.

The metallic copper can be recovered from the solution, containing the iron and copper salts, drained from the sand, and from the solution of copper and iron salts obtained by washing the treated sand, by any of the well-known methods suitable for this purpose, for example by treating the solutions in question with scrap iron in an appropriate form of apparatus. Thus by efficient recovery of the copper the process is rendered very economical and becomes quite cheap to operate.

Other examples of the reduction in associated iron oxide content of sands treated by the process hereinbefore described according to the present invention, are as follows:

| Initial iron oxide content of sand | Final iron oxide content of sand after treatment |
| --- | --- |
| 0.038 percent $Fe_2O_3$ | 0.019 percent $Fe_2O_3$ |
| 0.058 percent $Fe_2O_3$ | 0.028 percent $Fe_2O_3$ |
| 0.031 percent $Fe_2O_3$ | 0.012 percent $Fe_2O_3$ |
| 0.15 percent $Fe_2O_3$ | 0.025 percent $Fe_2O_3$ |

By means of the new process according to the present invention sands which would otherwise be unsuitable for the manufacture of colourless glass on account of their high iron oxide content can now be purified at a reasonably low cost and in a simple manner and thereafter utilised in the glass industry. Thus the present process is appropriate for the treatment of sands having a much higher content of associated surface iron oxide than that of sands which could be treated by the previously known processes, and as a result of the treatment in accordance with the invention the content of iron oxide in the sand is reduced by a greater amount than was previously feasible.

What I claim and desire to secure by Letters Patent of the United States is:

1. A process for the purification of silica sands by the reduction of the associated surface iron oxide content thereof to a fraction not exceeding about one half of the said original surface iron oxide content, which process consists in subjecting the sand to treatment with a hot aqueous solution, at a temperature of the order of about 70° C. to 90° C., containing a small quantity of sulphuric acid of the order of about 1 to 2 percent by weight of the said solution and a smaller quantity, of the order of about 1 to 10 percent by weight of the sulphuric acid, of a soluble inorganic chloride which dissolves in the said solution without the formation of an insoluble sulphate, in the presence of metallic copper having a large surface area so as to give an ample metallic surface contact for the sand and solution during the purification treatment.

2. A process according to claim 1, in which the inorganic chloride employed in the aqueous solution used for the purification treatment of the sand is selected from the class comprising sodium chloride, potassium chloride, magnesium chloride and ammonium chloride.

3. A process according to claim 1, in which the inorganic chloride employed in the aqueous solution used for the purification treatment of the sand is sodium chloride.

4. A process according to claim 1, in which the sand to be purified together with the treatment solution is passed through a copper tube provided internally with copper rods so as to give an ample metallic surface contact for the sand and treatment solution during their passage through the tube.

5. A process according to claim 1, in which the sand, after the completion of the purification treatment, is separated from the solution used during said treatment, whereafter the sand so separated is finally washed with water so as to free it from all traces of soluble copper and iron salts.

References Cited in the file of this patent

UNITED STATES PATENTS

| | | |
| --- | --- | --- |
| 2,049,359 | Dusing et al. | July 28, 1936 |
| 2,071,720 | Adams | Feb. 23, 1937 |
| 2,306,021 | Knowles et al. | Dec. 2, 1942 |

OTHER REFERENCES

Mellor: "Treatise on Inorganic and Theoretical Chemistry" (1923), vol. 3, page 87.